United States Patent Office 3,645,959
Patented Feb. 29, 1972

3,645,959
PREPARATION OF HIGH MOLECULAR WEIGHT VINYL POLYMERS
Louis Anthony Pilato, Bound Brook, N.J., and Henry Octave Colomb, Jr., South Charleston, W. Va., assignors to Union Carbide Corporation, New York, N.Y.
No Drawing. Filed Jan. 5, 1970, Ser. No. 824
Int. Cl. C08f 45/28, 47/20
U.S. Cl. 260—33.6 DA                    15 Claims

ABSTRACT OF THE DISCLOSURE

High molecular weight, non-aqueous dispersions, of such vinyl polymers as polyvinyl acetate, polyvinyl stearate, polyvinyl chloride, polyalkyl acrylates, polyalkyl methacrylates, and polystyrene have been prepared by copolymerizing the respective monomer with up to about one percent of a diene such as norbornadiene, ethylidene norbornene, the Diels-Alder reaction product of cyclopentadiene and norbornadiene, norbornadiene dimer and dicyclopentadiene.

BACKGROUND OF THE INVENTION

This invention relates to the preparation of high molecular weight, non-aqueous dispersions of vinyl polymers by copolymerizing the respective vinyl monomers with up to about 1 percent by weight of a diene.

There has been a continuing search and need in the polymer field for vinyl polymers having higher molecular weights than are ordinarily obtained by the use of conventional polymerization systems. One general approach to the solution of this problem has been the use of difunctional comonomers to join chains of lower molecular weight vinyl polymers thereby converting them to higher molecular weight vinyl polymers. Examples of difunctional comonomers include ethylene glycol dimethacrylate, ethylene glycol diacryate, divinyl succinate, divinyl benzene and the like. Unsatisfactory results have been obtained with the use of such comonomers due to the fact that they often lead to highly crosslinked, insoluble products or gels even at low monomer conversions.

SUMMARY OF THE INVENTION

A method for preparing high molecular weight vinyl polymers in the form of non-aqueous dispersions has been found which comprises:

(a) heating with agitation at a temperature of about 25° to 150° C. for at least 30 minutes:

(1) A mixture of a vinyl monomer and a hydrocarbon diluent said vinyl monomer being present in a concentration of about 5 to 85 percent by weight;
(2) about 0.01 to 1.0 percent of a diene selected from the group consisting of norbornadiene, ethylidene norbornene, the Diels-Alder reaction product of cyclopentadiene and norbornadiene, norbornadiene dimer or dicyclopentadiene based on the weight of vinyl monomer in (1);
(3) about 0.1 to 10 percent of a polymeric organic interfacial agent, based on the weight of vinyl monomer in (1); and
(4) about 0.01 to 1 percent based on the weight of vinyl monomer in (1) of a free radical polymerization initiator; and (b) recovering, non-aqueous dispersions of a normally solid vinyl polymer having a solution viscosity of at least 1,000 centipoises when measured as a 1 molar solution in benzene at 20° C.

Although this method is applicable to vinyl monomers in general capable of undergoing free radical initiated addition polymerizations, it is particularly useful for the preparation of high molecular weight vinyl esters having 3 to about 21 carbon atoms, such as, vinyl acetate, vinyl laurate, vinyl stearate and the like; alkyl acrylate or methacrylates having 1 to about 18 carbon atoms in the alkyl moiety, such as methyl acrylate, methylmethacrylate, ethyl acrylate, ethyl methacrylate, lauryl methacrylate, stearyl methacrylate, and the like; aromatic vinyl monomers, such as, styrene, p-methylstyrene, and the like; and halogenated vinyl monomers, such as, vinyl chloride, vinyl fluoride, and the like.

It is particularly preferred to use vinyl esters as the vinyl monomers in the practice of this invention with vinyl acetate being the most preferred vinyl monomer of this group.

Although the concentration of vinyl monomer in the mixture of vinyl monomer and hydrocarbon diluent can be as low as 5% and as high as 85% by weight it is preferred to employ a concentration of about 45% to 75% with 50% to 70% being particularly preferred.

The preferred hydrocarbon diluents are inert aliphatic or cycloaliphatic hydrocarbons having from about 5 to 12 carbon atoms therein with pentane, isopentane, hexane, heptane, and isooctane being preferred aliphatic hydrocarbons and cyclopentane, cyclohexane, and methylcyclohexane being preferred cycloaliphatic hydrocarbons, as well as mixtures of the above.

Although aromatic hydrocarbons, ethers, esters, and other polar groups containing diluents inert towards free radical initiators cannot be used in this invention alone, they may be if mixed with aliphatic or cycloaliphatic hydrocarbons such as those enumerated above.

The polymeric organic interfacial agent used in the present invention must be one which has a backbone that is soluble in the inert hydrocarbon diluent and which has a site for grafting or anchoring to the polymerized vinyl ester used. The preferred interfacial agents include copolymers and graft copolymers of alpha-olefins and vinyl esters, alpha-olefins with other polar groups containing vinyl monomers, polyvinyl alkyl ethers, propylene oxide rubbers, butadiene-styrene rubbers, ethylene-propylene terpolymers, and the like.

It is particularly preferred to employ as the polymeric organic interfacial agent copolymers of an alpha-olefin and a vinyl ester with ethylene-vinyl acetate copolymers being most preferred. These ethylene-vinyl acetate copolymers preferably contain from about 5 to 80 percent vinyl acetate copolymerized therein with 28 to 50 percent vinyl acetate being particularly preferred.

The preferred alkyl vinyl ether polymer is polyvinyl ethyl ether, although others such as polyvinyl isobutyl ether, polyvinyl propyl ether and the like can also be used if desired.

The concentration of polymeric organic interfacial agents should be at leat 0.1 percent based on the weight of the vinyl monomer charged. It is preferred to use at least 0.2 percent, up to about 10 percent and if desired, even higher concentrations.

It is preferred in the practice of this invention to employ as the free radical polymerization initiators those which have a half life at 50° C. of about 20 hours or less. Examples of free radical initiators which meet this standard include t - butyl - peroxy pivalate ($T_{1/2}$=20.0 hours), di(sec-butyl) peroxydicarbonate ($T_{1/2}$=5.4 hours), diisopropyl peroxydicarbonate ($T_{1/2}$=6.0 hours), acetyl cyclohexane sulfone peroxide ($T_{1/2}$=3.8 hours), isobutyryl peroxide ($T_{1/2}$=1.3 hours), and the like.

Although polymerization temperatures of about 25 to 150° C. can be used it is preferred to employ a range of about 50 to 100° C.

As a general statement in free radical initiated vinyl polymerization there is no critical upper limit for polymerization time other than that imposed by economic considerations. It was discovered surprisingly that this is true in this invention only when the amount of diene copolymerized with the vinyl monomer is about 0.5 percent or less based on the weight of vinyl monomer. Thus as will be seen later in the examples when 1.0 percent of norbornadiene was used in the polymerization of vinyl acetate a maximum molecular weight was obtained at a polymerization time of 1 hour but that the molecular weight of the polyvinyl acetate obtained decreased at 2 hours and further decreased at 4 hours polymerization time as indicated by the inherent viscosity values recorded.

If more than about 1 percent of diene based on the weight of vinyl monomer is used in this polymerization, a deleterious effect is encountered in addition to limiting polymerization time and that is the formation of a gelled and ostensibly crosslinked polymeric product. It is therefore preferred to use a range of about 0.01 to 1 percent of diene with a range of about 0.05 to 0.5 percent being particularly preferred.

The high molecular weight products prepared by the practice of this invention are useful as textile coatings, binders for printing inks or powdered metals, high melt solvent based adhesives, and the like. In addition the polyvinyl esters thus prepared and in particular polyvinyl acetate can be converted to partially acylated terpolymers containing up to about 30 percent by weight of vinyl alcohol moiety without a significant loss in molecular weight. Conventionally prepared polyvinyl acetates undergo a severe drop in molecular weight when saponified even to this extent.

An added advantage of this system is the fact that the high molecular weight vinyl polymers so produced are obtained in the form of non-aqueous dispersions which are more easily handled than solutions even at higher solids content.

All of the dienes described in this invention are either commercially available or their method of preparation indicated in the examples.

The invention is further described in the examples which follow. All parts and percentages are by weight unless otherwise specified.

CONTROL A

A 4-neck flask equipped with a stirrer, reflux condenser, thermometer and nitrogen inlet tube was charged with 240 grams of vinyl acetate, 3.6 grams of an ethylene-vinyl acetate copolymer containing 28 percent vinyl acetate copolymerized therein and having an inherent viscosity of 0.54 (0.1 g. in 100 ml. toluene at 25° C.), 1 gram of methylethyl ketone, 80 g. of mixed isomeric octanes (Phillips Petroleum Co. No. 240) and 80 g. of isopentane. The mixture was heated under nitrogen to 52° C. with stirring until all of the ethylene-vinyl acetate copolymer had dissolved. Then 1 ml. of isobutyryl peroxide dissolved in 10 ml. of mixed isomeric octanes (Phillips Petroleum Co. No. 240) was added. After about 1.5 hours a haze developed indicating the onset of polymerization. The polymerization was allowed to continue at about 50° C. for about 20 hours. A non-aqueous dispersion of polyvinyl acetate was obtained which after stripping off the solvent afforded a product which had a solution viscosity of 16.5 centipoises (1 molar solution in benzene at 20° C.).

CONTROL B

In the apparatus described in Control A a mixture of 240 grams of vinyl acetate, 1 g. of methylethyl ketone, 3.6 grams of ethylene-vinyl acetate copolymer containing 28 percent vinyl acetate copolymerized therein and having an inherent viscosity of 0.54 (measured as a solution of 0.1 gram in 199 ml. of toluene at 25° C.), and 157 grams of hexane was heated to 64° C. until a clear solution was obtained. A solution of 1 ml. of t-butylperoxy pivalate in 5 ml. of hexane was added rapidly to the mixture which was heated to 64° C. Polymerization was allowed to proceed for about 20 hours after which time the reaction mixture consisted of a non-aqueous dispersion of polyvinyl acetate. The solvents were stripped from the stable dispersion leaving polyvinyl acetate having a solution viscosity of 33.2 centipoises (1 mole in benzene at 20° C.).

Example 1

Into the equipment described in Control A was charged a mixture of 230 grams of vinyl acetate, 157 grams of hexane, 3 grams of methylethyl ketone, 3.6 grams of the ethylene-vinyl acetate copolymers described in Example 1 and 1.2 grams of freshly distilled norbornadiene, (0.5% by weight of the vinyl acetate charged). This mixture was then heated to 61° C. together with 1.0 ml. of t-butylperoxy pivalate in 5 ml. of hexane. After 19 hours a quantitative conversion to a non-aqueous dispersion of polyvinyl acetate was obtained. After stripping off the solvent the residual polyvinyl acetate had a solution viscosity of 3360 centipoises (measured as a 1 molar solution in benzene at 30° C.).

Example 2

Example 1 was repeated with the exception that 2.4 grams of freshly distilled norbornadiene was used (1.0% by weight of the vinyl acetate charged). Reaction appeared to be completed in 10 hours and the non-aqueous dispersion of polyvinyl acetate was then stripped free of solvent. The solution viscosity was 1845 centipoises (measured as a 1 moler solution in benzene at 20° C.).

Example 3

Example 1 was repeated with the exception that 0.85 gram (0.375% of the vinyl acetate charged) of freshly distilled norbornadiene was used. Polymerization appeared to be complete after 7.5 hours and the resultant polyvinyl acetate after stripping the non-aqueous dispersion thereof had a solution viscosity of greater than 1,000.

Examples 4–7

Using the equipment described in Control A there was charged to the polymerization flask a mixture of 475.2 grams of vinyl acetate, 4.8 grams (1.0% by weight of the vinyl acetate charged) of norbornadiene, 314 grams of hexane, 6.0 grams of methylethyl ketone, 7.2 grams of the ethylene-vinyl acetate copolymer described above and 2.0 ml. of t-butylperoxy pivalate in 10 ml. hexane. Four samples were removed after polymerization times of 0.5 hour, 1.0 hour, 2.0 hours, and 4.0 hours, respectively. The inherent viscosities of these four products are shown in the table below.

| Example | Time (hours) | Inherent viscosity [a] |
| --- | --- | --- |
| 4 | 0.5 | 0.58 |
| 5 | 1.0 | 1.23 |
| 6 | 2.0 | 0.55 |
| 7 | 4.0 | 0.47 |

[a] 0.2 percent polution in cyclohexanone at 30° C.

CONTROL C

The procedure described in Example 1 was repeated with a charge consisting of 228 grams of vinyl acetate, 12 grams of norbornadiene (5 percent by weight based on the weight of vinyl acetate), 12 grams of the ethylene-vinyl acetate copolymers described in Control A, 3 grams of methylethyl ketone, 157 grams of hexane, and 1 ml. of t-butylperoxy pivalate in 10 ml. of hexane. After 6 hours polymerization at 61° C., a high solids dispersion of polyvinyl acetate in hexane was obtained. However, much of the product was crosslinked as shown by a large amount of insoluble material making it impossible to measure solution viscosity.

Example 8

Using the equipment described in Control A the flask was charged with a solution of 478 grams of vinyl acetate, 314 grams of hexane, 6 grams of methylethyl ketone, 7.2 grams of the ethylene vinyl acetate copolymer described in Control A, 1.8 grams (0.375% by weight of the vinyl acetate charged) of distilled ethylidene norbornene (0.375 percent based on the weight of vinyl acetate charged), and 2.0 ml. of t-butylperoxy pivalate in 10 ml. of hexane. After polymerization at 8 hours at 61° C. the stable non-aqueous dispersion of polyvinyl acetate was obtained which after evaporation of the solvents had a solution viscosity above 1,000 cps.

Example 9

Using the equipment described in Control A the polymerization flask was charged with a solution of 478 grams of vinyl acetate, 1.8 grams (0.375 percent based on the weight of vinyl acetate) of the Diels-Alder of cyclopentadiene and norbornadiene prepared according to Stille and Frey, J. Am. Chem. Soc. 81 4273 (1969), and having the formula:

together with 304 grams of hexane, 6.0 grams of methylethyl ketone, 7.2 grams of the ethylene-vinyl acetate copolymer described in Control A and 2.0 ml. of t-butylperoxy pivalate in 10 ml. of hexane. A non-aqueous dispersion of polyvinyl acetate was obtained after a polymerization time of 6 hours at 61° C. The polyvinyl acetate product after stripping off the solvents was found to have a solvent viscosity above 1,000 cps.

Example 10

Using the procedure described in Control A the polymerization flask was charged with a solution of 239 grams of vinyl acetate, 0.9 gram (0.375 percent based on the weight of vinyl acetate charged) of dimerized norbornadiene prepared according to U.S. 3,440,294, R. L. Pruett and E. A. Rick and having the formula:

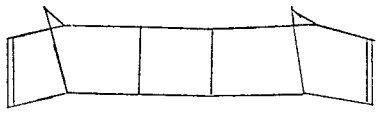

together with 157 grams of hexane, 3 grams of methylethyl ketone, 3.6 grams of ethylene-vinyl acetate copolymer described in Control A and 1 ml. of t-butylperoxy pivalate in 5 ml. of hexane. After a polymerization time of 6 hours at 61° C. a non-aqueous dispersion of polyvinyl acetate was obtained which after removal of the the solvents was found to have a solution viscosity of above 1000.

Example 11

When Example 10 is repeated with the exception that 0.9 g. of dicyclopentadiene is substituted for the dimerized norbornadiene a high molecular weight non-aqueous dispersion of polyvinyl acetate is obtained.

Example 12

When the procedure described in Example 1 is repeated with the exception that the vinyl acetate monomer is replaced by 170 grams of vinyl chloride monomer, a non-aqueous dispersion of high molecular weight polyvinyl chloride is obtained.

Example 13

When Example 1 is repeated with the exception that the vinyl acetate monomer is replaced by 866 grams of vinyl stearate monomer, a non-aqueous dispersion of high molecular weight polyvinyl stearate is obtained.

Example 14

When Example 1 is repeated with the exception that the vinyl acetate monomer is replaced by 278 grams of methyl methacrylate monomer, a non-aqueous dispersion of high molecular weight polymethyl methacrylate is obtained.

Example 15

When Example 1 is repeated with the exception that the vinyl acetate monomer is replaced by 270 g. of ethyl acrylate monomer, a non-aqueous dispersion of high molecular weight polyethyl acrylate is obtained.

Example 16

The preparation of high molecular weight partially hydrolyzed polyvinyl acetate was demonstrated by charging a stirred 4-neck flask with 200 grams of a 60 percent solids non-aqueous dispersion in hexane of the polyvinyl acetate prepared in Example 1 together with 1.2 ml. of aqueous hydrochloric acid in 28 ml. of methyl and 0.5 gram of triphenyl phosphine. After stirring for 5 hours the mixture was neutralized with 2 ml. of 1,2-propylene oxide dissolved in 3 ml. of hexane. A non-aqueous dispersion of partially hydrolyzable polyvinyl acetate was obtained containing 30 percent by weight of polyvinyl alcohol as determined by conventional saponification tests. A 25 percent solids solution of this partially hydrolyzed polyvinyl acetate in butyl acetate had a Brookfield viscosity of 2510 centipoises.

CONTROL D

Example 1 was repeated with the exception that 7.2 grams of freshly distilled norbornadiene (3 percent based on the weight of vinyl acetate charged) was used. Instead of obtaining a stable non-aqueous dispersion of polyvinyl acetate the system collapsed into a two-phase mixture containing gels and excessive crosslinked product making the solution viscosity determinations impossible because of the lack of solubility of the crosslinked polyvinyl acetate in the solvent cyclohexanone.

Determination of inherent viscosity

A sample of dry polymer weighing about 0.20 gram was placed in a 100 ml. volumetric flask and diluted to the mark with cyclohexanone. The solution was kept in a 30° C. constant temperature bath for a period of two hours prior to the viscosity determination. A Cannon-Fenske viscometer ASTM size 50 was used for the viscosity determination. An average of 4 or 5 readings was taken for each value recorded. For the formula for the determination of inherent viscosity is:

$$\eta_{inh} = \frac{\ln t_s - t_o}{C}$$

wherein $t_s$ = flow time of same
$t_o$ = flow time of reference solvent
$C$ = concentration of polymer solution in grams per 100 ml. of solution

Determination of solution viscosity

The solution viscosity measurements were determined by first measuring the kinematic viscosity of the molar solutions of the polymers in benzene at 20° C. and then converting this value to centipoises by multiplying it by the polymer density. This method is described on pages 698–699, vol. 1, part 1 of "Physical Methods of Organic Chemistry," edited by A. Weissberger, Interscience Publishers, N.Y.C. (1965).

Determination of degree or percent hydrolysis

A two gram sample partially hydrolyzed product was placed in a 500 ml. Erlenmeyer flask with a ground glass standard tapered 24/40 opening. About 5 ml. of methanol was added to the dry sample which dispersed the resin and then 50 ml. of water was added. To the resulting heterogeneous mixture, 50 ml. of approximately 0.5 N KOH in methanol was added from burette. The basic mixture heated under reflux for one hour, cooled and titrated with standard 0.5 N HCl to a phenolphthalein end point. A blank was prepared and determined simultaneously. The titer, or difference in the volume of acid required for the blank less the sample yielded the weight percent of polyvinyl acetate by proper substitution in the formula:

$$\text{percent acetate} = \frac{(V)(N)(8.6)}{\text{weight of sample}}$$

V = volume of titer in milliliters
N = normality of standard acid

The weight percent of polyvinyl acetate was then transformed into mole percent which is the reported extent of hydrolysis.

Although the invention has been disclosed in its preferred form with a certain degree of particularity, it is understood that the present disclosure has been made only by way of example, and that numerous changes can be made without departing from the spirit and scope of the invention.

What is claimed is:

1. Method for preparing high molecular weight, non-aqueous dispersions of vinyl polymers which comprises:
   (a) heating with agitation at a temperature of about 25° C. to 150° C. for at least 30 minutes,
      (1) a mixture of a vinyl monomer and a hydrocarbon diluent, said vinyl monomer being present in a concentration of about 5 to 85 percent by weight;
      (2) about 0.01 to 1.0 percent of a diene selected from the group consisting of norbornadiene, ethlidene norbornene, the Diels-Alder reaction product of cyclopentadiene and norbornadiene, norbornadiene dimer or dicyclopentadiene based on the weight of vinyl monomer in (1);
      (3) about 0.1 to 10 percent of a polymeric organic interfacial agent, based on the weight of vinyl monomer in (1); and
      (4) about 0.01 to 1 percent, based on the weight of vinyl monomers in (1) of a free radical polymerization initiator; and
   (b) recovering, non-aqueous dispersions of a normally solid vinyl polymer having a solution viscosity of at least 1,000 centipoises when measured as a 1 molar solution in benzene at 20° C.

2. A method claimed in claim 1 wherein the vinyl monomer is vinyl acetate.
3. Method claimed in claim 1 wherein the vinyl monomer is vinyl stearate.
4. Method claimed in claim 1 wherein the vinyl monomer is styrene.
5. Method claim in claim 1 wherein the vinyl monomer is methyl methacrylate.
6. Method claimed in claim 1 wherein the vinyl monomer is ethyl acrylate.
7. Method claimed in claim 1 wherein the vinyl monomer is vinyl chloride.
8. Method claimed in claim 1 wherein the diene is norbornadiene.
9. Method claimed in claim 1 wherein the diene is ethylidene norbornene.
10. Method claimed in claim 1 wherein the diene is the Diels-Alder reaction product of cyclopentadiene and norbornadiene.
11. Method claimed in claim 1 wherein the diene is norbornadiene dimer.
12. Method claimed in claim 1 wherein the diene is dicyclopentadiene.
13. Method claimed in claim 1 wherein the interfacial agent is a copolymer of ethylene and vinyl acetate.
14. Method claimed in claim 1 wherein the free radical polymerization initiator is t-butylperoxy pivalate.
15. Method claimed in claim 8 wherein the amount of norbornadiene is in the range of 0.375 to 0.50% based on the weight of vinyl monomer.

References Cited
UNITED STATES PATENTS

| | | | |
|---|---|---|---|
| 3,287,327 | 11/1966 | Zutty | 260—78.5 |
| 3,519,701 | 7/1970 | Pilato et al. | 260—874 |
| 3,271,477 | 9/1966 | Kresge | 260—879 |
| 3,328,488 | 6/1967 | Delacretaz et al. | 260—879 |
| 3,166,524 | 1/1965 | Schmidle | 260—23 |

ALLAN LIEBERMAN, Primary Examiner

J. H. DERRINGTON, Assistant Examiner

U.S. Cl. X.R.

260—34.2, 878, 879, 880, 889, 900, 901